United States Patent Office 3,384,356
Patented May 21, 1968

3,384,356
TIRE FASTENING FOR A ROTARY SHELL
René Durinck, Helemmes, France, assignor to Société Fives Lille-Cail, Paris, France
Filed Mar. 11, 1966, Ser. No. 533,483
Claims priority, application France, Mar. 11, 1965, 8,769
5 Claims. (Cl. 263—33)

ABSTRACT OF THE DISCLOSURE

The riding ring of a tubular, rotary kiln has a cylindrical inner face opposite a conically flaring surface section of the kiln shell, and is held to the shell by interposed wedges having outer and inner faces respectively conforming to the inner face of the ring and the conical surface section of the shell, and abuttingly engaging the conforming surfaces of the ring and shell at the operating temperature of the kiln. Abutments on the wedges axially secure the same to the ring which itself is axially secured by abutments on the shell. The conical shell surface section may be formed by wedges fixed to a cylindrical surface.

The present invention relates to rotary kilns, such as are used, for example, in firing cement, and more particularly to a tire fastening for rotary shells of the type adapted to be supported intermediate their ends upon rollers. The races for such rollers are constituted by riding rings forming part of such tire fastenings.

In conventional tire fastening, wedges of uniform thickness are placed in the clearance between the shell and the riding ring, and to make the mounting possible, a play of several millimeters must be left between the ring and the wedges. When the kiln is operated, the shell expands more than the riding ring because the kiln is brought to a high temperature but this expansion does not always suffice to eliminate the play between shell and ring. This causes sliding of one in relation to the other.

It is the primary object of the present invention to overcome these disadvantages, and to make it possible so to mount the ring on the shell as to make the adjustment of the play therebetween possible, thus producing tight engagement between ring and shell during operation of the kiln.

For this purpose, this invention provides a series of wedge means circumferentially spaced in the clearance between the rotary shell and the riding ring. Each wedge means has a cylindrical exterior surface complementary with the interior surface of the riding ring and an inclined interior surface complementary to an exterior circumferentially extending shell surface section inclined in relation to the axis of the shell in the direction of the axis. This wedge means is fixed in position to prevent radial displacement of the riding ring in respect of the shell. Abutments are mounted on the wedge means and bear laterally against the riding ring to fix the position of the wedge means in relation to the riding ring. A plurality of anchor blocks are fixed to the shell and provide lateral abutments for the riding ring to fix the position of the latter in relation to the shell. The wedge means and the anchor blocks are alternatingly spaced about the circumference of the shell.

The above and other objects, features and advantages of the present invention will become better understood by reference to the following detailed description of two specific embodiments thereof, taken in conjunction with the accompanying drawing wherein FIG. 1 is a fragmentary longitudinal section of a kiln including a tire fastening mounted on its rotary shell according to one embodiment of this invention;

Figure 1:
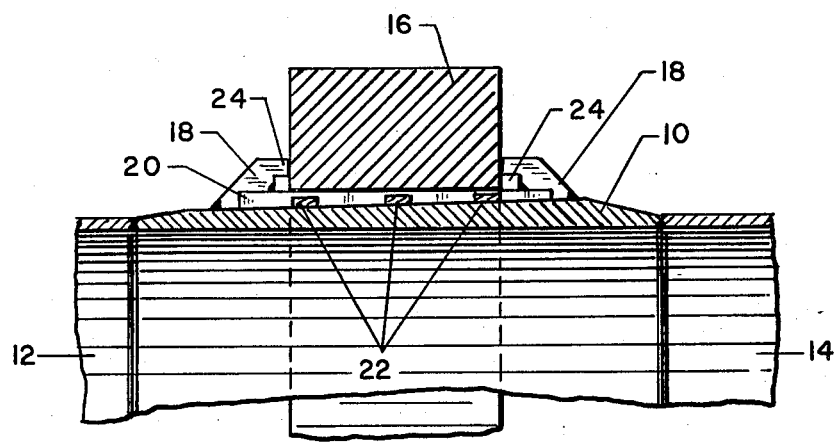
Figure 2:
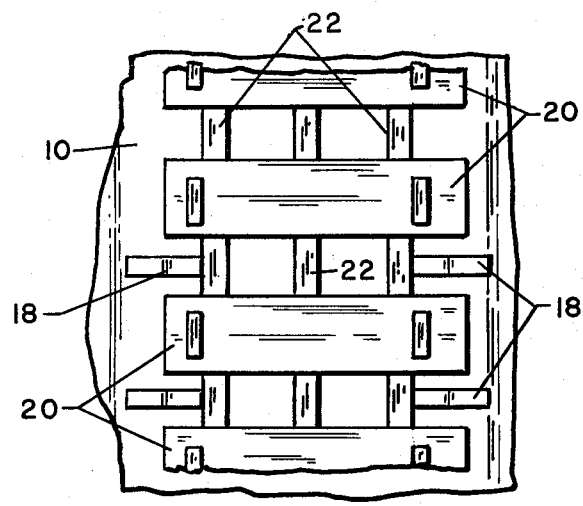
FIG. 2 is a top view of the tire fastening of FIG. 1, with the riding ring removed.

Referring now to the drawing and first to FIGS. 1 and 2, there is shown a section 10 of a shell which is connected to two end sections 12 and 14, the connections of the shell sections being illustrated as welds. The interior surface of shell sections 10, 12, 14 is cylindrical while the exterior surface of shell section 10 is slightly conical having, for instance, an inclination in respect of the cylindrical surface in the range of about 2.5%.

The shell sections constitute a rotary shell adapted to be supported intermediate its ends upon rollers (not shown) engaging riding ring 16. The ring is part of the tire fastening, the conical surface of the shell section 10 and the interior cylindrical surface of the riding ring 16 defining a clearance therebetween. The riding ring is held on the shell section 10 against lateral displacement by a plurality of circumferentially spaced anchor blocks 18 rigidly fastened to the shell, such fastening being illustrated as welding. The anchor blocks provide lateral abutments for the riding ring 16.

Radial displacement of the riding ring in respect of the rotary shell is prevented by a series of circumferentially spaced wedges 20. The wedges are positioned in the clearance between the riding ring and the rotary shell, each wedge having one cylindrical bearing surface of the same diameter as the interior diameter of the riding ring and another surface of substantially the same inclination as the exterior surface of shell section 10 so that the bearing surfaces of the wedges 20 are complementary to the respective adjacent surfaces of the riding ring and the rotary shell. The wedges 20 alternate circumferentially with the anchor blocks 18, as best seen in FIG. 2. The spacing of the wedges is maintained by blocks 22 positioned between adjacent wedges.

This tire fastening is assembled in the following manner:

The axial position of the riding ring 16 is first provisionally established by placing the anchor blocks 18 temporarily on the shell periphery. Then, the play at normal temperature between the wedges and the ring is adjusted by displacing the wedges 20 in the clearance between the ring and the shell in the direction of the axis of the shell. This play is so adjusted that there is a tight engagement between the riding ring and the rotary shell during normal operating conditions of the kiln. After the kiln has been heated, the proper placement of the rollers on riding ring 16 is verified. If there is improper engagement of the rollers with the riding ring, the wedges must be displaced, the anchor blocks removed, and the process must be repeated by trial and error until a proper fit is obtained. At this point, the wedges are fixed in the selected position by means of abutments 24 fixedly connected to the wedges, such connection being illustrated as welding, and laterally engaging the riding ring. The anchor blocks 18 are then also welded to the rotary shell so as to fix the ring permanently in position.

Obviously, the fixed abutments 24 may be replaced by adjustable abutments which would permit further adjustment of the wedge positions, if desired.

Figure 3:
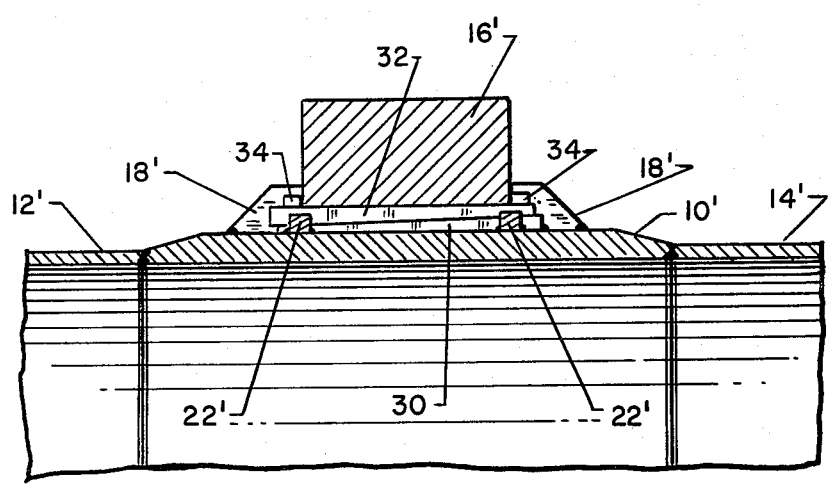
FIG. 3 is a view similar to that of FIG. 1 of another embodiment of the invention.
Figure 4:
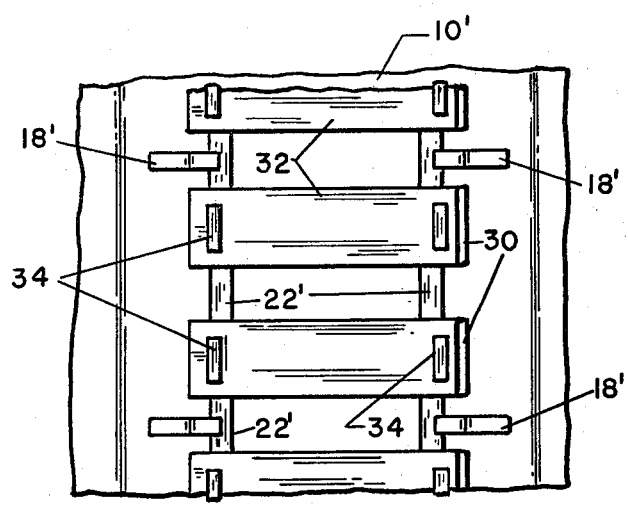
FIG. 4 is a view similar to that of FIG. 2 of the embodiment of FIG. 3.

In the embodiment of FIGS. 3 and 4, the exterior surface of intermediate shell section 10' is cylindrical as in conventional tire fastenings of this type, the end sections 12' and 14' being welded to the intermediate section, as in the above-described embodiment. Also in the same manner, the riding ring 16' defines a clearance with the shell and is held thereon against lateral displacement by anchor blocks 18'. In this embodiment, however, each wedge means preventing radial displacement of the riding ring 16' in respect of the rotary shell consists of a pair of complementary wedges 30 and 32.

The wedge means are spaced circumferentially around the entire shell, as in the first-described embodiment, being maintained in their spaced position by blocks 22' welded to the shell. The first wedge 30 of each wedge means is also fixed to the shell, as by welding, and has an interior cylindrical surface of the same diameter as that of the cylindrical exterior surface of the shell section 10'. Its exterior surface is plane and inclined in relation to the axis of the cylindrical shell. The second wedge 32 of each wedge means has an exterior cylindrical surface of the same diameter as the interior cylindrical surface of the riding ring 16'. Its interior surface is also plane and inclined to be complementary to the exterior surface of the first wedge, having the same angle of inclination as the latter surface. In each wedging position, the first and second wedges are so positioned that their cylindrical surfaces are parallel to each other.

Also similarly to the first-described embodiment, the anchor blocks 18' and the wedge means 30, 32 are so positioned around the periphery of the shell as to alternate with each other (see FIG. 4), and the spacing blocks 22' hold the wedges 32 against displacement in a circumferential direction.

The wedges 30 and the spacing blocks 22' are fixed to the shell before the riding ring is mounted thereon. Then, as in the first-described embodiment, the abutments 18' are provisionally placed in position, the play between the ring and the shell is regulated by trial and error by adjusting the position of the wedges 32 in relation to wedges 30 between the spacing blocks 22'. Finally, after proper adjustment, the wedges 32 are fixed in position by abutments 34' bearing laterally against the riding ring, and the abutments 18' are welded to the shell.

The last-described embodiment has the advantage that this tire fastening may be mounted on a conventional rotary shell with a cylindrical outer surface.

While the invention has been described in connection with specific embodiments, it will be understood that many variations and modifications may occur to those skilled in the art, particularly after benefitting from the preesnt teaching, without departing from the spirit and scope of the appended claims defining the invention.

What is claimed is:

1. A tire fastening for a rotary shell of the type adapted to be supported intermediate its ends upon rollers, the shell having an axis and an exterior circumferentially extending surface section inclined in relation to the axis in the direction of the axis, said tire fastening comprising
    (1) a riding ring surrounding the shell, the riding ring having a cylindrical interior surface defining a clearance with the inclined surface section of the shell,
    (2) a series of wedge means circumferentially spaced in said clearance, each of said wedge means having a cylindrical exterior surface complementary with the interior surface of the riding ring and an inclined interior surface complementary to the inclined surface section of the shell, said wedge means being fixed in position to prevent radial displacement of the riding ring in respect of the shell,
    (3) abutments mounted on said wedge means and bearing laterally against the riding ring to fix the position of the wedge means in relation to the riding ring, and
    (4) a plurality of anchor blocks fixed to the shell and providing lateral abutments for the riding ring to fix the position of the riding ring in relation to the shell.

2. The tire fastening of claim 1, wherein the shell includes an intermediate shell section having a cylindrical interior surface and a slightly conical exterior surface constituting said inclined surface section, and each of said wedge means consists of a wedge having a cylindrical exterior surface complementary with the interior surface of the riding ring and an interior surface complementary to the inclined surface section of the shell.

3. The tire fastening of claim 1, including a plurality of first wedges having a cylindrical interior surface complementary to the exterior surface of the shell and an exterior surface inclined in relation to the axis of the shell, the inclined exterior surfaces of the first wedges jointly constituting said inclined surface section of the shell, and each wedge means including a second wedge having a cylindrical exterior surface complementary with the interior surface of the riding ring and an inclined interior surface complementary to the said inclined surface section.

4. The tire fastening of claim 1, further comprising spacing blocks between the wedge means for maintaining the circumferential spacing thereof.

5. The tire fastening of claim 1, wherein the wedge means and the anchor blocks are atlernatingly spaced about the circumference of the shell.

References Cited

UNITED STATES PATENTS

| 1,188,567 | 6/1916 | Singer | 263—33 |
| 2,132,321 | 10/1938 | Rice | 308—204 |
| 2,543,594 | 2/1951 | Patten | 308—204 |
| 3,023,056 | 2/1962 | Smith | 308—204 |

FOREIGN PATENTS

| 1,092,837 | 11/1954 | France. |

FREDERICK L. MATTESON, JR., *Primary Examiner.*

JOHN J. CAMBY, *Examiner.*